United States Patent

[11] 3,543,894

| [72] | Inventor | Emil E. Giese, |
| | | Bad Hamburg, vor der Hohe, Germany |
| [21] | Appl. No. | 815,802 |
| [22] | Filed | April 14, 1969 |
| [45] | Patented | Dec. 1, 1970 |
| [73] | Assignee | Ringspann Albrecht Maurer KG., |
| | | Bad Hamburg, Germany |
| [32] | Priority | April 22, 1968 |
| [33] | | Austria |
| [31] | | No. 3906/68 |

[54] RETAINER RING
16 Claims, 5 Drawing Figs.

[52] U.S. Cl. ............................................... 192/45.1;
308/217
[51] Int. Cl. ........................................ F16d 41/07;
F16c 33/50
[50] Field of Search ........................................ 192/45.1,
41(.3); 308/201, 217

[56] References Cited
UNITED STATES PATENTS

| 1,241,669 | 10/1917 | Schneider.................... | 308/201 |
| 1,966,266 | 7/1934 | Skelly........................... | 308/217 |
| 2,417,559 | 3/1947 | Larson ......................... | 308/217 |
| 3,022,875 | 2/1962 | Davis............................ | 192/45.1 |

*Primary Examiner*—Allan D. Herrmann
*Attorney*—Otto John Munz

ABSTRACT: A retainer ring is assembled from individual links consisting of two oblong flanges arranged opposite to one another and being combined in the middle section by a bridgelike stud. Each of the two flange portions on one side of the stud are provided with the positive elements of a hinge while each of the two flange portions on the other side of the stud are provided with the negative elements of a hinge matching the positive elements. A clamping member or a bearing member and associated resilient means are arranged between the flanges of each link.

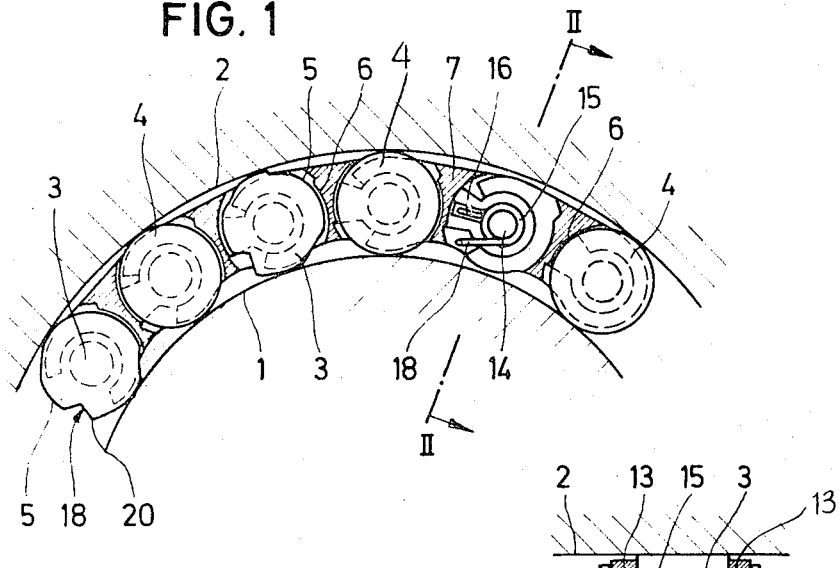
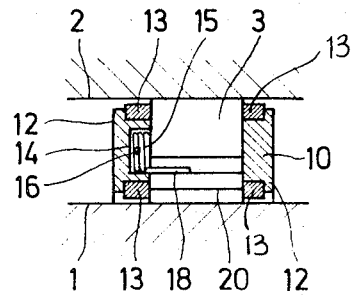
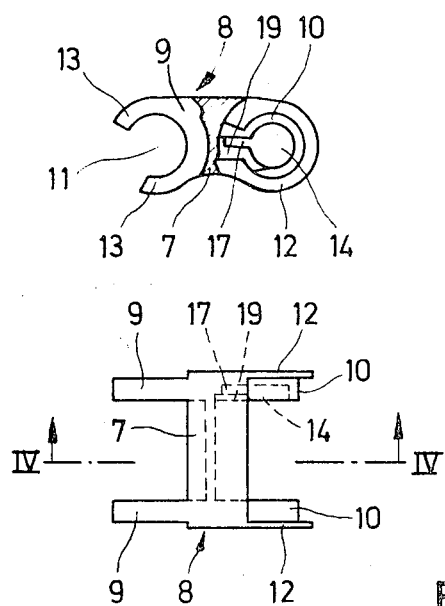
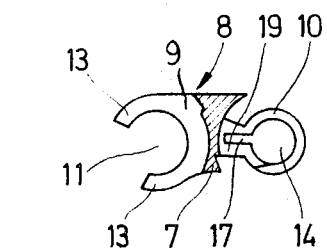

RETAINER RING

BACKGROUND OF THE INVENTION

The present invention relates generally to link-type rings, and more particularly to retainer rings as employed, for example in freewheel clutches, ball or roller bearings, and the like.

Although the invention is in the following specification disclosed mostly with reference to freewheel clutches, with ball or roller bearings being mentioned only occasionally, it is to be understood that the retainer ring according to the invention can be used not only in freewheel clutches but with equal advantage also in bearings.

In a freewheel clutch the retainer ring keeps the clamping elements in their working position distributed at even distances along a circle of about middle diameter between the two clamping surfaces, for example, of an inner and an outer ring member.

The retainer rings of the prior art usually consist of two flat rings of appropriate diameter, for example cut from sheet metal, which are kept at a distance opposite from one another by suitable means such as rivets or spacers. The number of spacers being preferably equal to the number of clamping members and the side portions of the spacers in the direction of the circumference being shaped so as to provide a guiding surface for the otherwise loose clamping members.

Retainer rings which are manufactured differently are also known in the art, for example such that are formed from one piece by cutting, shaping, and such that are produced by pressing and/or die casting. However, the mode of manufacture being of no significance relative to the present invention.

It is now, a disadvantage that all retainer rings of the prior art whether assembled from single parts or manufactured as a solid body are designed to fit in one particular size of freewheel clutches only. This means that together with all the other elements of the clutches, the retainer ring must also be designed and manufactured according to the middle diameter of the two clamping surfaces of the inner and outer ring member of a particular clutch size. Consequently, such prior art retainer rings will fit only in one particular clutch size and in none other. Along with all the other parts of the clutch the retainer ring must be produced and kept in stock. As a result the production costs of the retainer rings are generally higher than is justified for such a relatively secondary part.

SUMMARY OF THE INVENTION

Accordingly, one object of this invention is to provide a new and improved retainer ring of relatively low cost manufacture.

Another object of the invention is the provision of a new and improved retainer ring which has the capability of fitting within all sizes of clutches within reasonable commercially acceptable size ranges.

Still another object of the present invention is to provide a new and improved retainer ring of relatively low cost manufacture which is easily installed and capable of being adapted to devices of various sizes.

Briefly, in accordance with one embodiment of this invention, these and other objects are attained by assembling a retainer ring from individual links comprising two oblong flanges arranged opposite to one another. The flanges are combined by a stud in the middle section and the flange portions on one side of the stud are provided with the positive elements of a hinge while the flange portions on the other side of the stud are provided with the negative elements of the hinge matching the positive elements. By mounting the negative elements of one link on the positive elements of an adjacent link a chain can be formed and by connecting the last link in the chain to the first one a retainer ring is formed. The diameter of the ring being dependent on the number of links and on the effective length of each link.

DESCRIPTION OF THE DRAWING

The invention will be more readily comprehended from the following description when taken in conjunction with the accompanying drawing, wherein the invention is illustrated by way of example in connection with a freewheel clutch, and wherein:

FIG. 1 is a partial view of a cross section of a freewheel clutch,

FIG. 2 is a sectional view of a freewheel clutch cut along the line II–II of FIG. 1, FIG. 3 is a top view in radial direction of a single link of the retainer ring in a first embodiment, FIG. 4 is a sectional view of a link cut along line IV–IV of FIG. 3, FIG. 5 is a sectional view of a second embodiment of a link cut along a line corresponding to line IV–IV of FIG. 3.

DESCRIPTION OF THE PREFERRED EMBODIMENT

Referring now to the drawing wherein like reference characters designate identical or corresponding parts throughout the several views, and more particularly to FIG. 1 thereof wherein a plurality of noncircular clamping elements 3 are illustrated as being arranged between a clamping surface 1 of the driving inner ring member and a clamping surface 2 of the driven outer ring member of a freewheel clutch. When it is so desired, roller bearing elements 4 may be substituted for or used alternately with clamping elements 3. Clamping elements 3 have generally cylindrically shaped clamping surfaces 5 surrounded by correspondingly cylindrically shaped bearing surfaces 6 formed on the sides of stud sections 7 on each link, which bearing surface also correspond to the shape of the bearing elements 4, so that the clamping elements 3 or bearing elements 4 can freely pivot. Stud section 7 is a solid portion of the links 8, as seen in FIGS. 3 and 4, which interconnects the side flange portions 9 thereof.

Each of the oblong-shaped flanges 9 are at one end shaped to form a disk or positive member 10 while at the other end they are shaped with a pair of flexible free end members or negative members 13 to form a ring that has in the direction of the circumference a mouthlike opening or cavity 11 and which ring is placed on the disk 10 of the adjacent link 8. Thus, the rings and disks pivotably or hingedly connect adjacent links in a radial plane of the freewheel clutch.

Depending on the width of the opening 11 a pivotable connection between two adjacent links can be established by sliding the rings over the disks either by a movement in axial direction or by a movement in a circumferential direction. Insertion of the clamping elements 3 and the bearing elements 4 has to be accomplished prior to sliding the rings over the disks in an axial movement, while if the rings are placed over the disks in a circumferential movement insertion has to be accomplished after connection of two adjacent links. To this end both links are to be pivoted relative to one another to such an extent that the distance between the outer edges in the radial direction of the studs 7 is greater than the diameter of the bearing elements 4 and greater than the diameter of the cylindrical clamping surfaces 5.

The disks 10 may be provided with shoulders 12, as illustrated in FIG. 4, which by enclosing the free ring ends 13 between the shoulders 12, clamping elements 3 or the bearing elements 4 respectively, rigidity of the retainer ring in axial direction will be improved. The links can only be connected to one another by a movement in the direction of the circumference when shoulders 12 are utilized. In order to assure that the retainer ring assembled from the links 8 does not fall apart prior to being inserted between the clamping surfaces 1 and 2 the openings 11 of the rings can be designed slightly smaller than the diameter of the disks 10, so that the free ends 13 of the rings are elastically deformed when the rings are placed over the disks. This is particularly true with links made from metal. In case the links are made from plastic material, for example produced by die casting, the opening 11 of the rings can be smaller on account of the greater elasticity of the material.

It has proven expedient to shape the links in such a way, that two adjacent links 8 can be pivoted relative to one another through an angle of 60°. This 60° angle is an optimal angle with regard to a reliable link connection on the one hand and to the formation of retainer rings from one link type having the greatest variety of middle diameters on the other hand.

Using the disclosed 60° angle, all retainer rings comprising as few as six links can be assembled from the links 8. It need not be mentioned that retainer rings can also be assembled from less than six links. In this case, however, the opening 11 of the rings must be shifted, as a consequence whereof two adjacent links can indeed occupy a position relative to one another wherein both links subtend an angle of less than 120°, however, the links can then no longer be stretched out to a straight line. Retainer rings comprising less than six links will, however, hardly be in demand.

In order to guarantee that the retainer rings assembled from individual links 8 will only have a minimum of radial play or slackness between the two clamping surfaces 1 and 2 the outer diameter of the rings is made only slightly smaller than the distance between the clamping surfaces.

The disk 10 of every link 8 is provided with a circular recess 14 wherein a helical spring 15 is inserted, the latter serving to keep the clamping member 3 in contact with the clamping surfaces 1 and 2.

One end 16 of the helical spring 15 is fixed in a deep recess 17 of link 8, while the free end 18 of spring 15, being bent over by 90°, acts upon clamping member 3.

By the side of the recess 17 is provided a further and more shallow recess 19 for guiding the free end 18 of spring 15; this recess 19 being dimensioned large enough to allow for free movement of clamping element 3 between its clamping position and the position wherein edge 20 of element 3 abuts against stud 7.

It is to be noted that the amount of diameter graduation possible with the retainer ring of the present invention is not seriously limited compared to the prior-art retainer rings, since these prior-art rings are also necessarily stepped in diameter according to the size and number of the used clamping or bearing elements.

A further advantage of the invention resides in the fact that the chain of links need not be closed to form a ring. The first and the last chain link can be left disconnected from one another, whereby a distance of different length is left between these two links. As a consequence, thereof a retainer ring according to this invention will fit between the two ring members of the clutch or bearing, even if the middle diameter of the two clamping surfaces or bearing surfaces respectively, does not match the graduation scale of the retainer ring, which graduation scale depends on the number of links employed.

Assembling of the links to form a chain can best be performed if the two flanges of the links which are on one side of the stud are ring-shaped, having an opening in this ring in circumferential direction, while the two flanges on the other side of the stud are disk-shaped with the inner diameter of the rings matching the diameter of the disks, so that the rings of one link can be placed over the disks of the adjacent link, so that the clamping elements are kept in contact with the clamping surfaces of the ring members, individual springs and arranged together with each clamping element, for which springs a recess is provided at one disk of every link adapted to receive and hold one end of a helical spring, the free end of which abuts against the clamping element and serves to pivot the element into contact with the clamping surfaces. The free end moves in another recess of the same disk. This latter recess allows for the pivoting motion of the free spring end between the clamping position and the position wherein the clamping element abuts against the stud.

While the links of a retainer ring according to the invention can be disassembled very easily when the ring is not mounted in a clutch or bearing, disassembling is practically impossible in mounted position since the lengthening of the ring, which necessarily occurs during disassembling, is prevented by the clamping surfaces of the ring members. However, in order to prevent the hinges from being exposed to too much strain in circumferential direction resulting from the impact of centrifugal forces on account of too much radial play, it proves advantageous if the width of the links in the radial direction is only slightly less than the distance between the two clamping surfaces.

Against displacement in the axial direction of the freewheel clutch the hinges or connections between adjacent links are secured by the clamping or bearing elements inserted in each link. However, in order to further prevent any distortion of the free ring ends in the axial direction and also in order to strengthen the whole retainer ring against axial bending it is expedient to provide the disks with a shoulder on the outer disk side so that the rings mounted on the disks are enclosed between the clamping elements and the shoulders.

If the disks are provided with shoulders it is, however, no longer possible to mount one link on another one by sliding the rings over the disks from one side, i.e., by a movement in the axial direction. Rather must the openings of the ring be designed so that the chain or retainer ring can be assembled by a movement in the direction of the circumference. In order to prevent the assembled retainer rings from falling apart prior to being mounted between the clamping surfaces of the freewheel clutch, the opening of the rings can be made slightly smaller than the diameter of the disks, as a consequence whereof the free ring ends will snap over the disks in the manner of a resilient detent while being elastically deformed.

Since retainer rings transmit only small forces in the circumferential direction, the links of the retainer rings can be made from plastic material. In spite of the shoulders being provided on the disks of the links, which shoulders prevent any assembling of the links by a movement in the axial direction. the disks and the rings are shaped in such a way that two adjacent links can be pivoted relative to one another through an angle of about 60°. On the one hand this 60° angle allows for the rings to well surround the disks, thus establishing good connection to the adjacent link while, on the other hand, all retainer rings comprising more than nine clamping or bearing elements can be assembled from one type of links only.

Obviously, numerous modifications and variations of the present invention are possible in the light of the above teachings. Therefore, it will be understood that within the scope of the appended claims the invention may be practical otherwise than specifically described herein.

I claim:

1. A retainer ring for keeping clamping elements 3 separately in their position between a surface 1 of the driving member and a surface 2 of the driven member of a freewheel clutch, said retainer ring being assembled from a plurality of links 8. each link comprising two oblong flanges 9 disposed opposite to one another and connected by a stud 7 in the middle flange portion, the two flange portions on one side of the stud being shaped to form the positive member 10 of a hinge and the two flange portions on the other side of the stud being shaped to form the negative member 13 of said hinge; said negative member of said links being hinged on said positive member of the adjacent link, thus forming a ring, between the studs of which said clamping elements are inserted.

2. A retainer ring as claimed in claim 1 wherein the width of said flanges 9 in radial direction is only slightly smaller than the distance between said driving member 1 and said driven member 2 of said freewheel clutch.

3. A retainer ring as claimed in claim 1 wherein said positive member of said hinge and said negative member of said hinge are shaped to allow for a pivoting motion of two connected links 8 through an angle of 60° from an outstretched position.

4. A retainer ring as claimed in claim 1 wherein the flange portions forming the positive member of the hinges are disk-shaped while the flange portions forming the negative members of the hinges are ring-shaped, said rings being provided with an opening 11 in the direction of the circumference of the retainer ring, the inner diameter of the rings corresponding to the diameter of the disks 10 so that the rings of one link can be hinged on the disks of another link.

5. A retainer ring as claimed in claim 4 wherein one disk 10 of each link is provided with a recess 14 adapted to receive a helical spring 15, wherein another recess 17 is provided for keeping one end of said spring stationary, and wherein a further recess 19 is provided for the free end 18 of said spring, said free end acting on said clamping element, said recess allowing for free movement of said spring end between the clamping position of said clamping element and a position wherein an edge 20 of said clamping element abuts against said stud.

6. A retainer ring as claimed in claim 4 wherein said disks 10 are on the outside provided with a shoulder 12 so that said rings, when hinged on said disks, are enclosed between said shoulder and said clamping element 3.

7. A retainer ring as claimed in claim 4 wherein said opening 11 of said ring is smaller than the diameter of said disks 10.

8. A retainer ring as claimed in claim 1 wherein said links 8 are made from plastic material.

9. A retainer ring for keeping the hearing elements separately in their position between the bearing surfaces of an inner and an outer ring member of a roller bearing, said retainer ring being assembled from a plurality of links 8, each link comprising two oblong flanges 9 disposed opposite to one another and connected by a stud 7 in the middle flange portion, the two flange portions at one side of the stud being shaped to form the positive member of a hinge and the two flange portions on the other side of the stud being shaped to form the negative member of said hinge; said negative member of said links being hinged on said positive member of the adjacent link, thus forming a ring; between the studs thereof said bearing elements are enclosed.

10. A link member adapted to be interconnected with a plurality of other link members of the same general configuration for forming a retainer ring capable of supporting a plurality of clamping members and bearings between a pair of cylindrical members; said link member comprising; a pair of oblong flanges disposed opposite to one another and connected by a stud in the middle flange portion, said flange portions on one side of said stud being shaped to form the positive member of a hinge and said flange portions on the other side of said stud being shaped to form the negative member of said hinge; said negative member of said link capable of being hinged on said positive member of an adjacent link so as to form a ring with a cavity formed between said links for receiving said clamping elements or bearings.

11. A link member as set forth in claim 10 wherein the width of said flanges in the radial direction is only slightly smaller than the distance between said concentric cylindrical members.

12. A link member as set forth in claim 10 wherein said positive member of said hinge and said negative member of said hinge are shaped to allow for a pivoting motion of two connected links through an angle of 60° from an outstretched position.

13. A link member as set forth in claim 10 wherein said flange portions forming said positive member of said hinge are disk-shaped while said flange portions forming said negative members of said hinges are ring-shaped, said rings being provided with an opening in the direction of the circumference of said retainer ring, the inner diameter of said rings corresponding to the diameter of said disks so that the rings of one link can be hinged on the disks of another disk.

14. A link member as set forth in claim 13 wherein one disk of said link is provided with a recess adapted to receive a helical spring, a second recess provided for keeping one end of said spring stationary, and wherein a third recess is provided for the free end of said spring, said free end acting on said clamping element, said recess allowing for free movement of said spring end between the clamping position of said clamping element and a position wherein an edge of said clamping element abuts against said stud.

15. A link member as set forth in claim 13 wherein said disks are on the outside provided with a shoulder so that said rings, when hinged on said disks, are enclosed between said shoulder and said clamping element.

16. A link member as set forth in claim 13 wherein said opening of said ring is smaller than the diameter of said disks.